United States Patent [19]

Burrous

[11] E Re. 31,403

[45] Reissued Oct. 4, 1983

[54] WEATHERSTRIP AND METHOD FOR SEALING A GAP

[75] Inventor: Allen J. Burrous, Hemlock, N.Y.

[73] Assignee: Schlegel Corporation, Rochester, N.Y.

[21] Appl. No.: 376,670

[22] Filed: May 10, 1982

Related U.S. Patent Documents

Reissue of:

[64] Patent No.: 4,214,930
Issued: Jul. 29, 1980
Appl. No.: 42,999
Filed: May 29, 1979

[51] Int. Cl.[3] ..... D04H 11/00; E06B 7/22

[52] U.S. Cl. ..... 156/60; 49/475; 49/489; 156/72; 156/71; 428/85; 428/88; 428/89; 428/358; 428/364; 428/101

[58] Field of Search ..... 428/85, 88, 89, 156, 428/364, 358, 542; 49/475, 488, 489, 493, 495; 156/1, 72

[56] References Cited

U.S. PATENT DOCUMENTS

| | | | |
|---|---|---|---|
| 3,175,256 | 3/1965 | Horton | 49/489 |
| 3,404,487 | 10/1968 | Johnson | 156/72 |
| 3,745,053 | 7/1973 | Johnson | 428/88 |
| 4,148,953 | 4/1979 | Horton | 428/85 |

*Primary Examiner*—Marion McCamish
*Attorney, Agent, or Firm*—Cumpston & Shaw

[57] ABSTRACT

A weatherstrip and method for sealing a gap comprising a base preferably of fabric material, and one or more sealing bodies such as rows of pile fibers extending longitudinally there along. A barrier strip formed of a thin film or sheet of flexible plastic material is secured at one edge to the base and/or sealing bodies and projects substantially above the free or upper ends of the pile members. Foamed cellular plastic bodies may be used in place of the bodies of pile fibers, or a single body of pile or foamed plastic material may be used with the barrier strip located on one side thereof.

14 Claims, 19 Drawing Figures

WEATHERSTRIP AND METHOD FOR SEALING A GAP

Matter enclosed in heavy brackets [ ] appears in the original patent but forms no part of this reissue specification; matter printed in italics indicates the additions made by reissue.

TECHNICAL FIELD

This invention relates to weatherstrips and methods for sealing gaps or joints such as those between doors, windows and other enclosures, and the frames of structural supports therefore. While such weatherstrips are capable of use in various places for various sealing or weatherstripping purposes, they are particularly suitable for use on wood or aluminum windows and doors for sealing or weatherstripping the small clearance openings between adjacent door panels or window panels or between the panels and the frames in which they are mounted or between the door edge and an adjacent surface such as a floor. More particularly, this invention relates to weatherstripping having a base of indefinite length from which project preferably filament members forming a pile along the length of the base, and a flexible barrier member located within or beside the pile and extending along the length of the pile to aid in sealing the joint.

BACKGROUND ART

It is well known to provide a weatherstrip having rows of pile extending longitudinally from a flexible base, and having a substantially impervious barrier comprising a thin film or sheet of plastic material secured to the base and/or to the pile to supplement the sealing action of the pile and increase the resistance to air infiltration through the weatherstrip. An example of this construction is shown in U.S. Pat. No. 3,175,256 in which the barrier member is located between adjacent rows of pile. It is also known to locate the barrier strip on one side of the body of pile as shown in U.S. Pat. No. 3,404,487, or on both sides of the pile as shown in U.S. Pat. No. 3,266,190. U.S. Pat. No. 3,745,053 discloses a weatherstrip having longitudinally extended rows of pile with an impervious barrier strip located between adjacent rows of pile and secured only to the pile.

However, in all of the weatherstrips having pile and a supplemental plastic film or sheet forming a substantially impervious barrier, it has been common practice to form the weatherstrip so that the plastic sheet is substantially the same height as the pile, or slightly below the height of the pile, or in certain instances, slightly above the pile height. However, in all cases, the differential in height between the upper edge of the plastic barrier and the pile has been minimal and these parts have been of substantially the same height. It has been found that despite the advantages of the plastic film in reducing air and moisture infiltration through the weatherstrip, the film increases the break-away force required to open the sliding window or door. Break-away force is defined as the force required to overcome the inertia of the window or door when starting from a fully closed position. The film tends to snap over or reverse itself as the sliding window or door is moved from a fully closed position, thereby increasing the resistance to such movement to the point that the break-away force required to open a door or window has become excessive. Hence, small children or elderly people often cannot open the windows or doors having such weatherstripping.

This invention has for its primary object the provision of a weatherstrip and method for sealing a gap which, although having a thin film or sheet of plastic, or the like, reinforcing the pile bodies to improve the resistance to air moisture infiltration, is so constructed that the opening or break-away force is significantly reduced while maintaining desired sealing properties. It has been found that the break-away force can be reduced by eliminating the plastic barrier member or by shortening it so that it is substantially lower in height than the top of the pile so that when the pile is compressed to the usual degree of approximately 20%, the barrier strip is not substantially bent or flexed. Although such a construction reduces the break-away force, it does not provide satisfactory sealing properties as the resistance of the weatherstrip to water and air infiltration is markedly reduced and an unsatisfactory seal results.

DISCLOSURE OF INVENTION

In accordance with the present invention, a weatherstrip and method is disclosed for sealing a gap between members such as doors, windows, joints or the like which are movable relative to one another between non-aligned and aligned positions. The weatherstrip has a backing strip for securing the weatherstrip to one of the members. At least one sealing body has one end portion fixed to one face of the backing strip and extends longitudinally thereof to form a sealing assembly. The sealing body extends from the face toward the other member to substantially close the gap between the members. A flexible film is positioned transverse to the face and is fixed adjacent one edge thereof to the sealing assembly. The opposite free edge of the film extends beyond the opposite free end portion of the sealing body for a substantial distance whereby the free edge of the film is bent over at least a part of the free end portion of the sealing body when the members are moved to their aligned position.

In other aspects of the invention, the free edge of the film extends beyond the free end portion of the sealing body a distance of between [0.015] *0.050* inches to 0.200 inches, and preferably approximately 0.100 inches. Also, the sealing body comprises a body of upstanding flexible and resilient fibers. The flexible film is substantially impervious and located between a pair of sealing bodies.

The advantages of the weatherseal of this invention are, among other things, to (1) reduce the break-away force required to move a door, window or the like from a fully closed position and (2) reduce air and moisture infiltration through the weatherseal.

BRIEF DESCRIPTION OF DRAWING

In the detailed description of the preferred embodiments of the invention presented below, reference is made to the accompanying drawings, in which.

BEST MODE FOR CARRYING OUT THE INVENTION

Figure 1:
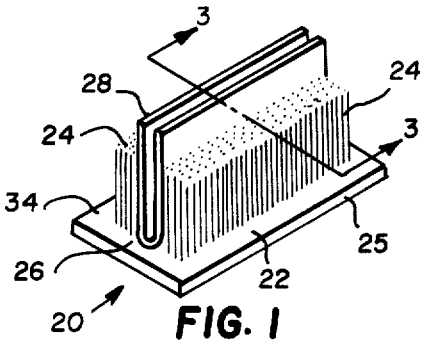
FIG. 1 is a perspective view of a weatherstrip embodying the present invention.
Figure 2:
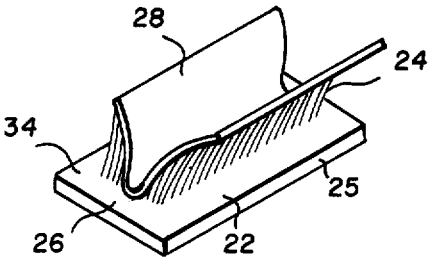
FIG. 2 is a view similar to FIG. 1 showing the position of the weatherstrip during a manufacturing step.
Figure 3:
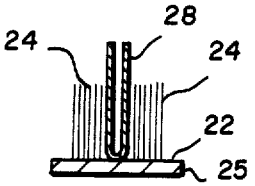
FIG. 3 is a sectional view of the weatherstrip shown in FIG. 1 taken substantially along line 3—3.

Referring now to FIGS. 1–3 of the drawings, the preferred embodiment of the weatherstrip of the invention is generally designated at 20 and comprises a backing or base strip 22 which, in one of its forms, is woven of textile fibers, either natural or synthetic, as is well known in the art. This base strip preferably has formed thereon bodies of up-standing resilient long pile fibers 24 which may be either cut or left un-cut. Such fibers may be of known plastic materials such as polypropylene, nylon, orlon, or may be made of natural fibers such as mohair, goat hair, wool, jute or the like, or any combination thereof. Base strip 22, is preferably formed by weaving, although the pile fibers may be fixed thereto by mechanical embedments, flocking, tufting or other known methods. Base strip 22 preferably has its marginal edges extending beyond the pile bodies as at 25 for ease in mounting the strip as is well known in the art. Base strip 22 is preferably formed with a narrow longitudinally extending gap or "skip" 26 intermediate its marginal edges, for a purpose which will be described hereinafter.

Base strip 22 is preferably given a coating of known polymeric material such as polypropylene, to protect it against abrasion, to stiffen it, and to facilitate the cutting of the strip without fraying.

A barrier strip 28 comprising a relatively thin flexible film or sheet of a known organic or inorganic thermoplastic or thermo setting material such as vinyl, nylon, glass fiber fabric coated with vinyl, polypropylene, polyethylene, or other known material is preferably secured adjacent its lower edge to base 22 along gap 26 by heat welding, by suitable adhesives or by other known means as is well understood in the art. Barrier strip 28 may also be secured to the adjacent pile fibers in addition to or instead of being attached to base 22, as is well known in the art. Barrier 28 is thus resiliently supported along the base and serves to increase the resistance of the weatherstrip to wind, rain or other elements that might otherwise penetrate the weatherstrip. While barrier strip 28 preferably comprises a film folded upon itself to form two leafs with the fold at the bottom, single or double leafs may be used as well.

FIG. 2 shows the pile bodies and barrier strip spread apart for ease in securing the barrier strip to the base strip and/or adjacent pile fibers.

While barrier strip 28 is preferably of an impervious plastic material, it also can be formed of woven or nonwoven or matted material which, while not totally impervious, is substantially impervious to wind and moisture under the conditions to which the weatherstripping is normally subjected.

Figure 4:
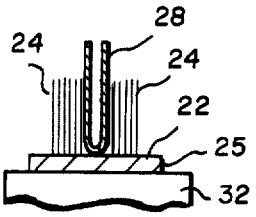
FIG. 4 is a view similar to FIG. 3, but showing the weatherstrip assembled on one of two relatively movable members.

FIG. 4 shows the weatherstripping affixed to one of the relatively movable members 32 and 34 which are to be sealed by the weatherstripping. The members 32, 34 may be portions of a window, door, joint or the like.

Figure 5:
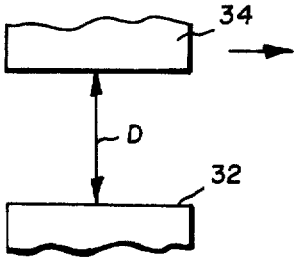
FIG. 5 is a fragmentary view in section showing the two relatively movable members to be sealed by a weatherstripping.

FIG. 5 shows members 32 and 34 in a closed or aligned position wherein the letter D indicates the distance or spacing between members 32 and 34, which spacing is to be sealed by the weatherstripping. In this illustration, member 34 has been moved laterally in the direction of the arrow into the aligned position.

Figure 6:
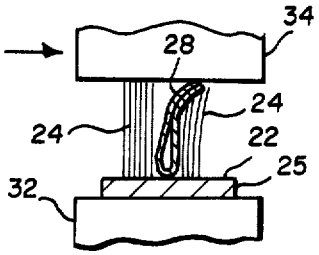
FIG. 6 shows the weatherstripping of FIG. 4 in position on one of the relatively movable members and the other member brought into position whereby it is contacted by said weatherstripping.
Figure 7:
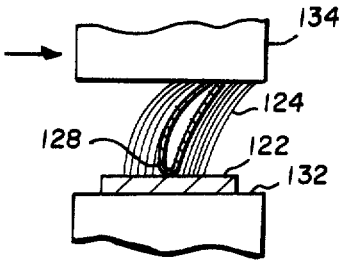
FIG. 7 (PRIOR ART)
FIG. 7 is a view similar to FIG. 6, but showing the prior art weatherstripping in sealing position between two relatively movable members.

It has heretofore been the practice when using weatherstripping for sealing such openings between members such as 32 and 34 to select a weatherstripping in which the bodies of pile fibers extend above the base strip 22 by a distance greater than distance D. Accordingly, when the weatherstripping is in an aligned sealing position, the pile fibers and barrier are subjected to a compression of approximately 15% to 30%, this being measured by the height of the fibers in normal relaxed position and the height of the fibers in their compressed position. Such a condition is shown in FIG. 7 wherein parts similar to those in FIG. 4–6 are indicated by numbers being 100 units higher. As shown in FIG. 7, the pile fibers 124 are under considerable compression and are bent over and the barrier 128 is similarly bent by the compression between parts 132 and 134. Under these conditions, while adequate sealing against water and air infiltration may occur, the break-away force is excessively high and renders the window or door unopenable by small children and elderly people. Such break-away forces may exceed 60 pounds on a normal sliding glass door.

In the present instance, the height of the pile 24 measured from the bottom of base 22 is selected so that the pile extends substantially to member 34, that is substantially equal to the distance D, but is not materially compressed or deflected by member 34 when members 32 and 34 are in opposed or aligned positions as shown in FIG. 6. Since barrier strip 28 extends substantially beyond the free ends of pile bodies 24, it is caused to bend in the direction of motion of member 34 relative to member 32 and lies over the top of the pile fibers on the right hand sealing body and forms a continuous barrier against air and water infiltration thereby providing the desired sealing action. This "laying-over" of member 28 is easily accomplished during the movement of member 34 in the direction of the arrow relative to member 32. In addition, when member 34 forms a part of a door, window or the like and is moved in the opposite direction so as to open the door or window, barrier 28 does not flip over and thus does not add to the opening resistance. Moreover, since pile bodies 24 are under substantially no compression or may even be under a negative compression, that is, they do not quite touch member 34, the break-away force needed to move member 34 is markedly reduced while at the same time providing an improved weatherstripping that creates an effective seal. Thus, by reducing the height of the pile bodies so that when in sealing position said bodies are under substantially no compression and by extending barrier strip 28 well beyond the upper ends of said pile bodies an improved seal is produced. It has been found that while barrier 28 may extend from [0.015] *0.050* inches [0.038] *0.127* centimeters) to 0.200 inches (0.508 centimeters) above the free ends of pile bodies 24, the preferred extension of barrier strip 28 above pile members 24 is substantially 0.100 inches (0.254 centimeters). Thus, the optimum conditions are substantially zero or negative compression of pile bodies 24 when in sealing position with barrier strip 28 extending approximately 0.100 inches (0.254 centimeters) beyond the free ends of said pile members.

Figure 8:
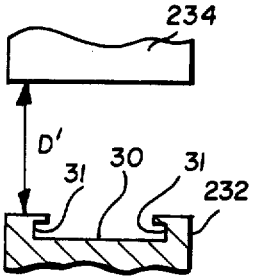
FIG. 8 is a view similar to FIG. 5, but showing another type of mounting for said weatherstrip.
Figure 9:
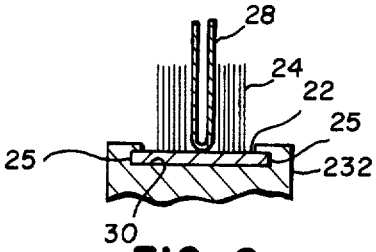
FIG. 9 is a sectional view of a weatherstrip similar to FIG. 3 mounted within an inverted T-shaped slot as shown in FIG. 8 in one of said relatively movable members.

FIGS. 8 and 9 show a pair of relatively movable members 232 and 234 in which member 232 is formed with in inverted "T"-shaped slot 30 providing opposed recesses 31 for the reception of marginal edges 25 of base 22 of weatherstripping 20. In FIG. 8 the letter D' indicates the distance or spacing between members 232 and 234, which spacing is to be sealed by the weatherstripping. FIG. 9 shows a weatherstripping of the type shown in FIGS. 1-3 mounted within a slot 30 of the type shown in FIG. 8.

Figure 10:
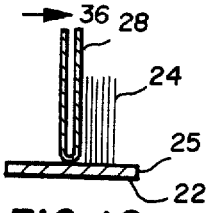
FIGS. 10–19 are views similar to FIG. 3, but showing modified embodiments of the weatherstrip.

While it is preferable to provide sealing bodies of pile fibers 24 on each side of barrier strip 28 as shown in FIGS. 1-3, it is sufficient for certain installation to provide only a single body of pile fibers 24 on one side of barrier strip 28. Such a construction is shown in FIG. 10 wherein an arrow 36 indicates the direction of the movable member (not shown) relative to the member on which base 22 is mounted. In this construction, the movement of the movable member in the direction of arrow 36 folds or bends barrier member 28 over the upper ends of pile members 24 similar to that shown at the right portion of FIG. 6. Thus, barrier strip 28 may be located at one side of the pile bodies 24.

Figure 11:
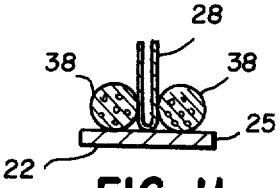
Figure 12:
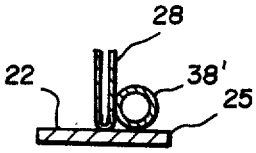
Figure 13:
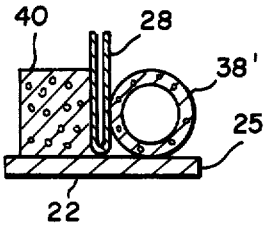

FIGS. 11-13 show further modifications in which a barrier strip 28 is located between or on one side of solid or hollow sealing bodies 38, 38', and 40. Barrier 28 performs in the same manner as in FIG. 10, and is bent over the upper edge of a sealing body when the movable members are brought into aligned or closed positions.

It has also been found that although it is preferable to locate barrier strip 28 between sealing bodies 24 of woven or flocked pile fibers, the sealing bodies may be formed of resilient, matted or foamed plastic or rubber material, of closed or open cell construction such as sponge rubber, polymeric foams or other known and suitable materials of suitable density. Such sealing bodies 38, 38', and 40 (FIGS. 11-13), may have a round, square or other suitable cross-sectional shape. Bodies 38 are formed with a hollow center to aid in providing the desired resiliency. Bodies 38, 38' and 40 are secured to base 22 by heat welding, adhesives or other suitable means. Sealing bodies are preferably selected to have a height from the bottom of base member 22 substantially equal to distance D shown in FIG. 5 in the same manner as the weatherstripping shown in FIG. 6.

Figure 14:
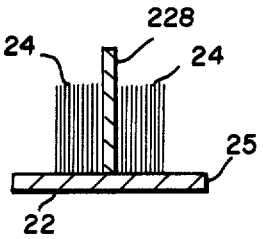

FIG. 14 shows a weatherstrip in which a barrier strip 228 is formed from a single film or sheet secured adjacent its lower edge by any suitable means to base 22 or to adjacent pile fibers 24.

Figure 15:
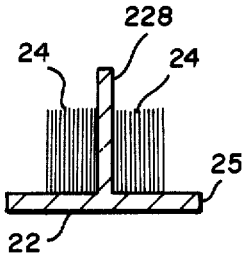

FIG. 15 shows a weatherstrip similar to the weatherstrip shown in FIG. 14 in which the barrier strip 228 is formed integral with base 22, preferably by an extrusion molding operation.

Figure 16:
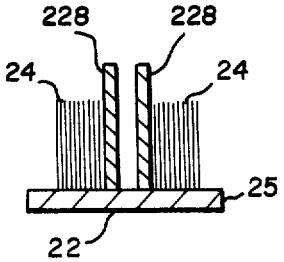

FIG. 16 is also similar to FIG. 14 and shows a pair of spaced apart strips 228 which may be secured to or integral with the sealing assembly comprising base 22 and sealing bodies 24.

Figure 17:
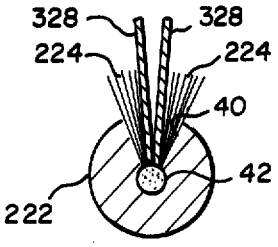
Figure 18:
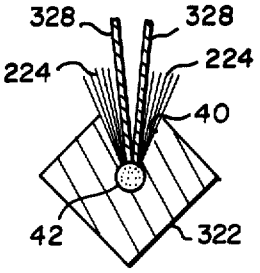
Figure 19:
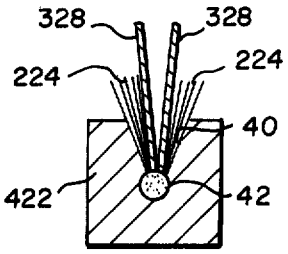

FIGS. 17-19 relate to a different form of weatherstripping in which a base 222, 322 or 422 is provided having a round or square cross-section. The base is slidably mounted within a complementary slot (similar to slot 30) of one of two relatively movable members, not shown. Each base is further provided with a V-shaped groove 40 terminating in an elongated central slot 42 for receiving the ends of pile fibers 224 and barrier strip 328. The fibers are secured adjacent their ends to the base by any suitable means, and the barrier strip is also secured to the base and/or to the adjacent pile fibers 224. In FIGS. 18 and 19, grooves 40 and bases 322 and 422 are oriented 45 degrees relative to one another.

This invention has been described in detail with particular reference to preferred embodiments thereof, but it will be understood that variations and modifications can be effected when the spirit and scope of the invention without departing from the terms of the invention.

I claim:

1. A weatherstrip for sealing a gap between members movable relative to one another between non-aligned and aligned positions, said weatherstrip comprising:

A. a backing strip for securing said weatherstrip to one of said members;

B. at least one sealing body having one surface portion thereof fixed to one face of said backing strip and extending longitudinally thereof and cooperating therewith for forming a sealing assembly, said sealing body extending from said face toward the other of said members to substantially close said gap between said members; and C. A flexible film fixed adjacent one edge portion thereof to said sealing assembly with said film transverse to said one face, the opposite free edge portion of said film extending beyond said opposite free surface portion of said sealing body for a substantial distance whereby said free edge portion of said film is bent over at least a part of said free surface portion of said sealing body when said members are moved to said aligned position.

2. A weatherstrip as specified in claim 1 in which there are at least a pair of sealing bodies fixed to said one face of said backing strip, and said flexible film is located between said sealing bodies.

3. A weatherstrip as specified in claims 1 or 2 in which said opposite free edge portion of said flexible film extends beyond said opposite free surface portion of said sealing body or bodies by a distance of between [0.015] *0.050* inches and 0.200 inches.

4. A weatherstrip as specified in claim 2 in which each of said sealing bodies comprises a body of upstanding, flexible resilient fibers fixed at one end surface thereof to said face of said backing strip.

5. A weatherstrip as specified in claim 4 in which said opposite free edge portion of said flexible film extends beyond the opposite free end surface of said fibers by a distance of from [0.015] *0.050* inches to 0.200 inches.

6. A weatherstrip as specified in claims 4 or 7 in which said opposite free edge portion of said flexible film extends beyond said opposite free end surface of said fibers by approximately 0.100 inches.

7. A weatherstrip as specified in claim 1 in which said sealing body comprises a body of up-standing flexible and resilient fibers fixed at one end surface thereof to said face of said backing strip.

8. A weatherstrip as specified in claim 7 in which said opposite free edge portion of said flexible film extends beyond the opposite free end surface of said fibers by a distance of from [0.015] *0.050* inches to 0.200 inches.

9. A weatherstrip as specified in claims 1 or 2 in which said opposite free edge portion of said flexible film extends beyond said opposite free surface portion of said sealing body or bodies by approximately 0.100 inches.

10. A method of sealing a gap between members movable relative to one another between non-aligned and aligned positions, said method comprising:

A. Affixing a backing strip of a weatherstrip to one of said relatively movable members, said backing strip having at least one sealing body having one surface portion thereof fixed to one face of said backing strip and extending transversely and longitudinally thereof and cooperating therewith for forming a sealing assembly;

B. selecting said sealing body of a size so that the opposite free surface portion of said sealing body when said one surface portion thereof is fixed to said backing strip substantially closes said gap between said members; and C. affixing a flexible film to said sealing assembly adjacent one edge portion of said film with said film positioned adjacent said sealing body and extending [transverse to] *transversely* said one face of said backing strip, and the opposite free edge portion of said film [extend] *extending* beyond the opposite free surface portion of said sealing body for a substantial distance whereby said film is bent over at least a part of said opposite free surface portion of said sealing body when said members are moved to said aligned position.

11. A method according to claim 10 wherein said opposite free edge portion of said film extends beyond said opposite free surface portion of said sealing body a distance of from [0.015] *0.050* inches to 0.200 inches.

12. A method according to claim 10 wherein said opposite free edge portion of said film extends beyond said opposite free surface portion of said sealing body a distance of approximately 0.100 inches.

13. A method according to claim 10 wherein said one sealing body comprises a body of up-standing flexible and resilient fibers fixed at one end surface thereof to said face of said backing strip, and the opposite free edge portion of said film extends beyond the opposite free end surface of said fibers a distance of from [0.015] *0.050* inches to 0.200 inches.

14. A method according to claim 10 wherein there are at least a pair of sealing bodies fixed to said one face of said backing strip, each of said sealing bodies comprises a body of up-standing flexible and resilient fibers fixed at one end surface thereof to said face of said backing strip, and said flexible film is substantially impervious and located between said sealing bodies with said opposite free edge portion of said film extending beyond said opposite free end surface of said fibers a distance of approximately 0.100 inches.

* * * * *